United States Patent
Becker et al.

(10) Patent No.: US 10,621,727 B1
(45) Date of Patent: Apr. 14, 2020

(54) LABEL AND FIELD IDENTIFICATION WITHOUT OPTICAL CHARACTER RECOGNITION (OCR)

(71) Applicant: INTUIT INC., Mountain View, CA (US)

(72) Inventors: Richard J. Becker, Alberta (CA); Pallavika Ramaswamy, Mountain View, CA (US); Daniel L. Moise, Alberta (CA); Sheldon Porcina, Alberta (CA)

(73) Assignee: INTUIT INC., Mountain View, CA (US)

(*) Notice: Subject to any disclaimer, the term of this patent is extended or adjusted under 35 U.S.C. 154(b) by 31 days.

(21) Appl. No.: 15/961,319

(22) Filed: Apr. 24, 2018

Related U.S. Application Data (63) Continuation of application No. 15/219,957, filed on Jul. 26, 2016, now Pat. No. 9,984,471.

(51) Int. Cl.
| | |
|---|---|
| *G06T 7/11* | (2017.01) |
| *G06K 9/00* | (2006.01) |
| *G06T 3/00* | (2006.01) |
| *G06N 20/00* | (2019.01) |

(52) U.S. Cl.
CPC .............. *G06T 7/11* (2017.01); *G06K 9/00442* (2013.01); *G06N 20/00* (2019.01); *G06T 3/0006* (2013.01); *G06K 2209/01* (2013.01)

(58) Field of Classification Search
CPC ......... G06T 7/12; G06T 7/0081; G06T 3/006; G06F 17/243; G06F 17/30705; G06F 17/30598; G06N 99/005; G06K 9/00442–9/00463
See application file for complete search history.

(56) References Cited

U.S. PATENT DOCUMENTS

| | | | | |
|---|---|---|---|---|
| 5,710,830 | A * | 1/1998 | Holeva | F24C 7/06 358/464 |
| 2009/0016564 | A1* | 1/2009 | Ke | G06K 9/00463 382/100 |
| 2009/0016615 | A1* | 1/2009 | Hull | G06K 9/00449 382/217 |
| 2012/0099792 | A1* | 4/2012 | Chevion | G06K 9/344 382/182 |
| 2012/0201457 | A1* | 8/2012 | Bart | G06K 9/00442 382/176 |
| 2013/0191715 | A1* | 7/2013 | Raskovic | G06F 17/245 715/227 |
| 2013/0279759 | A1* | 10/2013 | Kagarlitsky | G06K 9/6202 382/105 |

(Continued)

*Primary Examiner* — Jingge Wu
(74) *Attorney, Agent, or Firm* — Patterson + Sheridan, LLP (57) ABSTRACT

Systems of the present disclosure allow fields and labels to be identified in a digital image of a form without performing OCR. A digital image of a form can be partitioned into image segments using computer-vision image-segmentation techniques. Features for each image segment can be extracted using computer-vision feature-detection methods. The features extracted from an image segment can be included in an input instance for a machine-learning model. The machine-learning model can assign a classification to the input instance. The classification can associate the input instance with a field type or a label type.

20 Claims, 8 Drawing Sheets

(56) References Cited

U.S. PATENT DOCUMENTS

| | | | | |
|---|---|---|---|---|
| 2014/0037182 | A1* | 2/2014 | Williams | G06K 9/00449 |
| | | | | 382/137 |
| 2015/0019460 | A1* | 1/2015 | Simard | G06F 17/2785 |
| | | | | 706/11 |
| 2015/0093021 | A1* | 4/2015 | Xu | G06K 9/00463 |
| | | | | 382/159 |
| 2015/0095022 | A1* | 4/2015 | Xu | G06K 9/00456 |
| | | | | 704/10 |
| 2015/0286888 | A1* | 10/2015 | Maison | G06F 17/21 |
| | | | | 382/182 |
| 2016/0019197 | A1* | 1/2016 | Iasi | G06F 17/243 |
| | | | | 715/224 |
| 2016/0189404 | A1* | 6/2016 | Edge | G06T 11/60 |
| | | | | 715/202 |
| 2016/0217119 | A1* | 7/2016 | Dakin | G06F 17/276 |
| 2016/0342681 | A1* | 11/2016 | Kesin | G06F 16/334 |
| 2016/0364458 | A1* | 12/2016 | Thevenet | G06F 16/957 |
| 2017/0004359 | A1* | 1/2017 | Venkatachalam | G06T 7/11 |
| 2017/0017899 | A1* | 1/2017 | Maor | G06N 20/00 |
| 2017/0046622 | A1* | 2/2017 | Gaither | G06F 17/2795 |
| 2017/0075873 | A1* | 3/2017 | Shetty | G06F 17/243 |
| 2017/0075974 | A1* | 3/2017 | Shetty | G06N 20/00 |
| 2017/0147691 | A1* | 5/2017 | Li | G06F 16/951 |
| 2017/0351913 | A1* | 12/2017 | Chen | G06K 9/00449 |

* cited by examiner

LABEL AND FIELD IDENTIFICATION WITHOUT OPTICAL CHARACTER RECOGNITION (OCR)

CROSS-REFERENCE TO RELATED APPLICATIONS

This application is a continuation of U.S. patent application Ser. No. 15/219,957, filed on Jul. 26, 2016, which is herein incorporated by reference in its entirety.

INTRODUCTION

The present disclosure generally relates to processing text content in digital images of documents or forms. More specifically, the present disclosure provides techniques for identifying fields and/or labels in a digital image of a form without using optical character recognition (OCR).

Forms are often used to collect, register, or record certain types of information about an entity (e.g., a person or a business), a transaction (e.g., a sale), an event (e.g., a birth), a contract (e.g., a rental agreement), or some other matter of interest. A form typically contains fields or sections for specific types of information associated with the subject matter of the form. A field is typically associated with one or more labels identifying the type of information that should be found in the field. In order to make information more readily accessible or electronically searchable, individuals, businesses, and governmental agencies often seek to digitize text found on paper forms. Optical character recognition (OCR) techniques are generally used to convert images of text into computer-encoded text. Satisfactory results can typically be achieved when OCR is applied to high-resolution, low-noise images of typed, uniformly black text against a uniformly white background.

Labels and fields generally allow desired information to be located quickly and unambiguously when a form is inspected. Thus, when a paper form is digitized, it can be useful to identify labels and fields within the digitized form. However, several difficulties may arise when OCR is applied to an image of a paper form. First, if the image quality is poor, the text of some labels may be incorrectly interpreted. Furthermore, even if the image quality is high, some labels may be in non-standard fonts or may be formatted unusually. On a certificate, for example, a label such as a title may be in an unusual calligraphic font against a watermark background and may be formatted using effects such as three-dimensional rotation, skewing, shading, shadowing, or reflecting. Such unusually formatted labels may defy computer interpretation by OCR.

DETAILED DESCRIPTION

Optical character recognition (OCR) techniques are generally used to convert images of text into computer-encoded text. Satisfactory results can be most easily achieved when OCR is applied to high-resolution, low-noise images of typed, uniformly black text against a uniformly white background. However, in practice, the representation of text in digital images is often noisy, obscured, or otherwise less than ideal. In some cases, for example, a physical document may be relatively obscured or deteriorated as a result of decomposition, excessive use, folding, fingerprints, water damage, or mildew at the time an image of the document is captured. Of course, the image of a document may be of poor-quality for a variety of other reasons (e.g., if the document is no longer extant and better images therefore cannot be obtained). Poor image quality tends to increase OCR processing time and decrease final accuracy. Thus, OCR techniques often fail to produce satisfactory results on poor-quality images.

In order to make information more readily accessible and searchable, individuals, businesses, and governmental agencies often digitize paper forms. For example, the Internal Revenue Service (IRS) may wish to digitize tax forms (e.g., 1040, W2, 1098-T, or 1099-MISC) submitted on paper so that information from the tax forms can be inspected for errors by an automated process. In another example, a law firm may digitize a large number of paper forms received in response to a discovery request so that the documents can be electronically searched for certain keywords. In another example, a web-based genealogical research company may wish to digitize a large number of death certificates in order to make information from the death certificates electronically searchable for customers.

Forms are often used to collect, register, or record certain types of information about an entity (e.g., a person or a business), a transaction (e.g., a sale), an event (e.g., a birth), a contract (e.g., a rental agreement), or some other matter of interest. A form typically contains fields or sections for specific types of information associated with the subject matter of the form. A field is typically associated with one or more labels identifying the type of information that should be found in the field. For example, a W2 form contains a field with the label "employee's social security number" in which an employee's social security number is entered. In another example, a death certificate typically contains at least one field that is associated with the label name (e.g., "first name" or "last name") in order to identify the deceased person to whom the certificate applies. In another example, a paper receipt typically has a labeled field indicating a total amount due for a transaction for which the receipt was issued.

A label for a field may be located near the field, but the label may also be associated with the field based on some other type of spatial or referential relationship that exists in the form. A single label may, in some examples, be associated with multiple fields and a single field may be associated with multiple labels. For example, a column label contained in a header row may be associated with all fields in the column, while a row label contained in a header column may be associated with all fields in the row. A single field may therefore be associated with both a column label and a row label; the column label or the row label may or may not be directly adjacent to the single field. In addition, in some forms, fields (or sections) may be contained within other fields (or sections). A label associated with a field (or section) may also be associated with any sub-fields (or sub-sections) contained therein based on a hierarchical relationship. For example, a tax form labeled with the title "1040" may include a section labeled "Income" that contains multiple fields, such as a field labeled "Unemployment Compensation." In this example, the more general labels "1040" and "Income," as well as the more specific label "Unemployment Compensation," are all associated with the field at differing levels of generality. "Unemployment Compensation" may be called an identifying label for the field, since there are no other labels that identify the field with greater specificity.

A field may refer to an area designated for providing a certain type of information. A text box, an underlined region, a radio button, a check box, or a blank space identifiable based on proximity to a label can all be considered examples of fields for the purposes of the disclosure. Although a field is designated to contain a certain type of information, the field may, in some cases, be left blank or may contain information that is only partial or incorrect.

Labels and fields generally allow desired information to be located quickly and unambiguously when a form is inspected. Thus, when a paper form is digitized, it can be useful to identify labels and fields within the digitized form. However, several difficulties may arise when OCR is applied to an image of a paper form. First, if the image quality is poor, the text of some labels may be incorrectly interpreted. Furthermore, even if the image quality is high, some labels may be in non-standard fonts or may be formatted unusually. On a certificate, for example, a label such as a title may be in an unusual calligraphic font against a watermark background and may be formatted using effects such as three-dimensional rotation, skewing, shading, shadowing, or reflecting.

In addition, even if the text of a label is interpreted correctly by OCR, context may be lost such that the text is not immediately recognizable as a label or the label is commingled with text from fields or other labels. For example, a paper 1040 tax form may have a field labeled "Your first name and initial" and a field labeled "Last name" located immediately adjacent to each other. The labels may be located in separate, outlined fields so that a person looking at the paper form could easily perceive that the labels apply to separate fields. However, if OCR is applied, the non-textual field boundaries may be overlooked such that the two labels are concatenated into the phrase "Your first name and initial Last name." This may lead to confusion, since a reader might assume that the phrase "initial Last name" refers to a maiden name.

In cases where the information in a form conforms to a known template, it may be possible to configure software applications to locate fields in an image of a form based on the fields' locations in the template. However, this approach is not effective if the template of the form is unknown. Furthermore, if multiple templates are possible for a certain type of form, different program instructions may have to be hard-coded for each possible template. Since templates for some forms (e.g., a 1040 tax form) periodically change and multiple templates are possible for other types of forms (e.g., birth certificates issued in different states), the limitations inherent in a purely templated approach are problematic.

Embodiments presented herein provide techniques to identify and classify fields and labels in digital images without using OCR and without a template. In one embodiment, computer-vision image-segmentation techniques divide an image of a form in to image segments. Features of a given image segment can be detected and quantified using computer-vision feature-detection methods. The resulting features can be used to create an input instance provided to a machine-learning model. The machine-learning model can classify the instance (and thus the image segment represented by the instance).

Multiple image-segmentation techniques may be used, such as techniques based on line boundaries, whitespace boundaries, thresholding, clustering, compression, histograms, edge detection, region growing, graph partitioning, and watershed transformation. Different image-segmentation techniques may be applied in parallel or sequentially to the digital image of the form. The resulting image segments can be isolated and processed separately in parallel or sequentially. Hence, one advantage of separating the image into segments is that all the segments may be processed simultaneously, thereby speeding up analysis of the total image.

Where multiple image-segmentation techniques are applied, overlapping image segments sometimes result. For example, an image-segmentation technique that evaluates line boundaries may produce line-boundary image segments, while an image-segmentation technique that evaluates whitespace boundaries may produce whitespace-boundary image segments. Image segments that overlap may be combined into one image segment.

Some types of features that can be detected and quantified include edges, corners, interest points, blobs, regions of interest, and ridges. Feature detection, extraction, or quantification may be performed in parallel on multiple image segments. Some computer-vision feature-detection methods operate extract features that are invariant to translation, scaling, and rotation and are partially invariant to illumination changes, local geometric distortion, and affine distortion. In addition, some computer feature-detection methods use an integer approximation of the determinant of a Hessian blob detector to extract one or more features that are based on the sum of the Haar wavelet response around a point of interest.

The classification assigned to the instance can be, for example, a field type or a label type or some other type (e.g., whitespace region, bar code, etc.). Multiple input instances may be classified in parallel (e.g., on multiple copies of the machine-learning model that are running in parallel).

In some embodiments, an image segment may be classified as a field that contains a specific type of information. This classification can be used to identify a subset of textual characters that may be depicted in the image segment. For example, if an image segment that has been classified as a field for a social security number (e.g., "box a" of W-2 form), the subset of textual characters may include digits and dashes and exclude letters. In some embodiments, once an image segment has been classified, it may be desirable to perform an OCR process to extract text depicted in the image segment. The OCR process can be modified or constrained to presume that text in the image segment contains only characters in the subset of textual characters. This may enable the OCR process to disambiguate extracted text more easily. For example, if a region in an image segment can be interpreted as either "1B" or "18," and if the image segment has been classified as a field for a social security number, the OCR process can elect "18" as the extracted text for the region because 1 and 8 are included in the subset of textual characters for social-security-number fields (while "I" and "B" are not).

In addition, if OCR is to be applied, the image segment can be preprocessed using spatial image filtering, point processing, contrast stretching, or thresholding. This offers an advantage because the preprocessing steps can be applied based on the image segment's local qualities (brightness, skew, distortion, etc.) rather than on the global qualities of the larger image from which the image segment was snipped.

The machine-learning model may be trained using training input instances comprising features extracted from image segments that have been assigned classifications that have verified as correct. To verify that a classification for an image snippet is correct, the image snippet may be presented to a user on a display and the user may manually provide or verify a correct classification for the image snippet.

Figure 1:
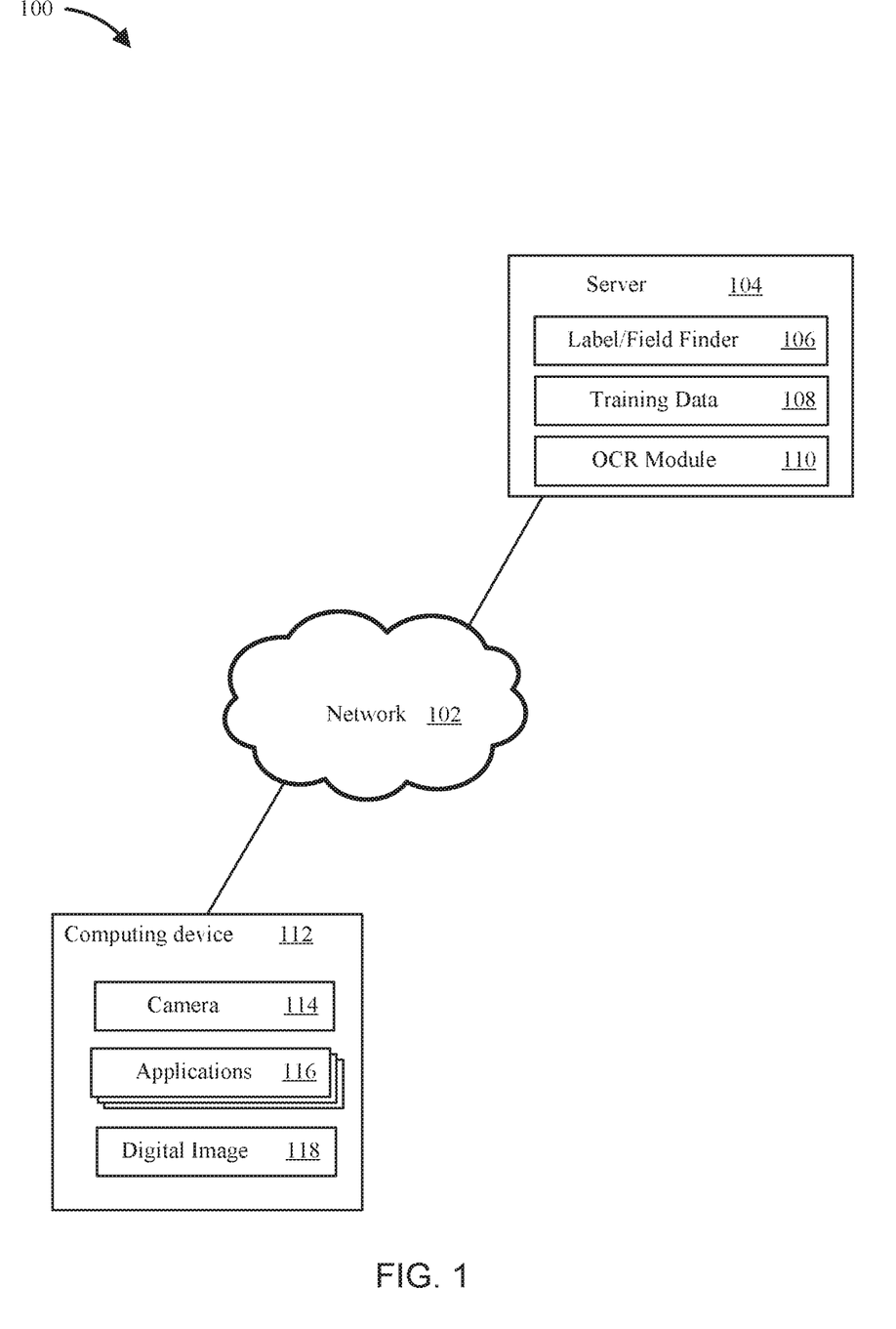
FIG. 1 illustrates an example computing environment that may be used to apply techniques of the present disclosure.

FIG. 1 illustrates a computing environment 100 that may be used to apply techniques of the present disclosure. A computing device 112 and a server 104 communicate via a network 102. As shown, the computing device 112 includes a camera 114. In addition, the computing device 112 is shown executing applications 116. A user obtains a digital image of a form using the camera 114. One of the applications 116 can send the digital image of the form to the server 104. In an alternative embodiment, a scanner may be used in place of the camera 114.

As shown, the server 104 includes a label/field finder 106. The label/field finder 106 has been trained using training data 108. The label/field finder 106 may extract image segments from a digital image 118 and classify the image segments without using OCR. For example, the label/field finder 106 can classify each image segment as a certain type of field or label that is found on the form.

The label/field finder 106 can provide the image segments and their classifications to the OCR module 110. The OCR module 110 can extract text from the image segments. The OCR module 110 can improve accuracy by taking the classifications for the image segments into account when extracting the text.

While the server 104 is depicted as a single server, it should be understood that techniques of the present disclosure can be applied in a cloud-based scheme using multiple physical or virtual computing resources. The label/field finder 106, the training data 108, and the OCR module 110 can be distributed across different computing resources as part of a cloud-based computing system.

The computing device 112 is included to be representative of a variety of devices, such as a mobile device, a cellular phone, a smart phone, a tablet, a laptop computer, a desktop computer, a personal digital assistant (PDA), or any computing system that may execute software applications.

Figure 2:
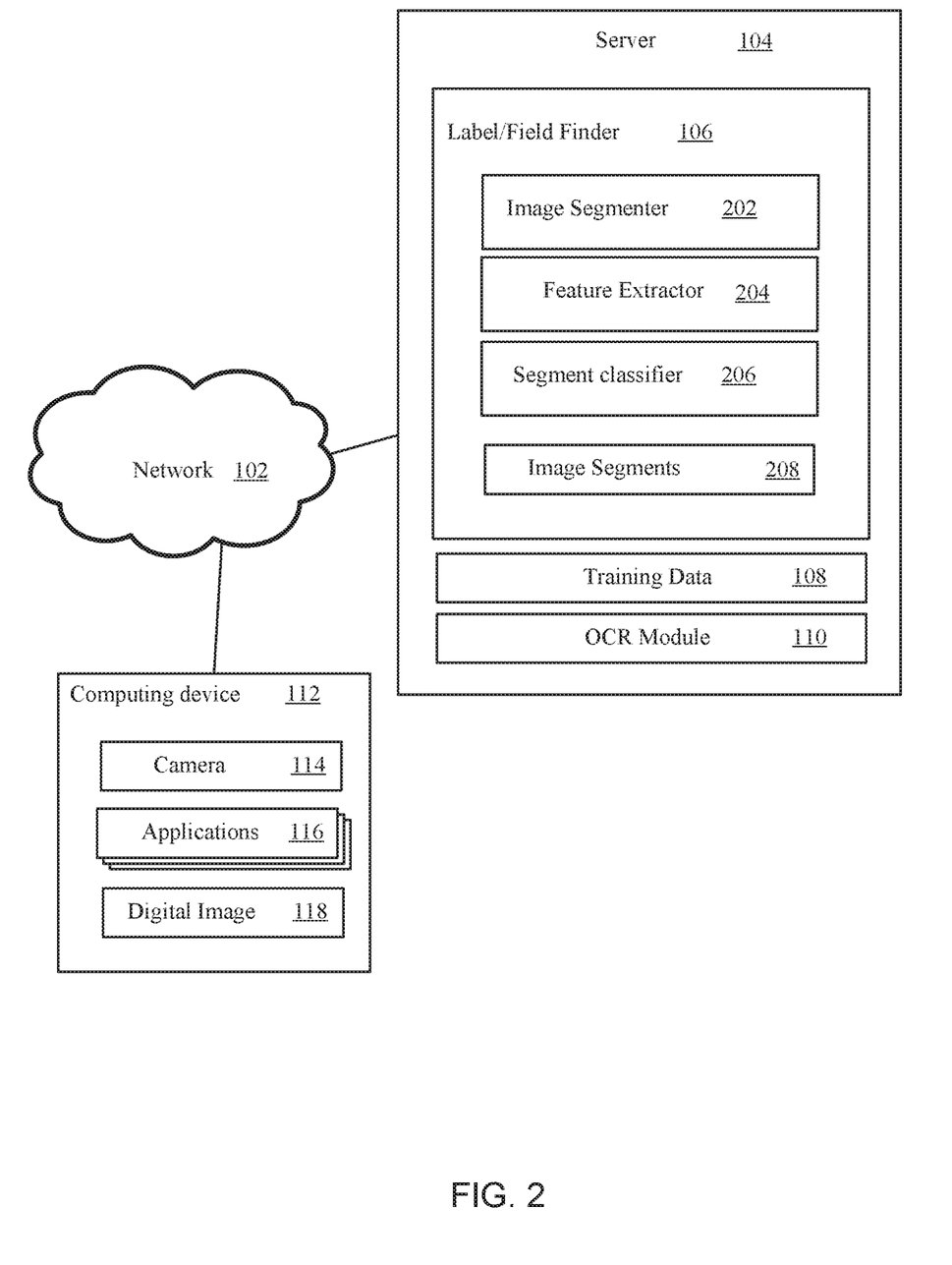
FIG. 2 further illustrates a detailed view of a label/field finder, according to one embodiment.

FIG. 2 further illustrates the label/field finder 106 first shown in FIG. 1, according to one embodiment. Illustratively, the label/field finder 106 includes an image segmenter 202, a feature extractor 204, and a segment classifier 206. When a digital image of a form is received at the label/field finder 106, the digital image is processed by the image segmenter 202. For example, the image segmenter 202 may segment the digital image into image segments using computer-vision techniques.

In computer vision, image segmentation generally refers to the process of partitioning a digital image into multiple segments, wherein a segment is a set of pixels. Image segmentation is often used to locate objects and boundaries (e.g., lines and gaps.) in images. Image segmentation methods often incorporate, for example, edge detection, corner or interest-point detection, or blob detection. Edge detection generally refers to mathematical approaches to identify points in a digital image at which brightness changes sharply (e.g., has discontinuities). Such points can be organized into curved line segments that are called edges. Corner or interest-point detection generally refers to computer-vision approaches that are used to detect corners and interest points. A corner can refer to an intersection of two edges or a point for which there are two dominant and different edge directions in a local neighborhood of the point. An interest point can refer to a robustly detectable point with a well-defined position in an image (e.g., a corner, an isolated point of local intensity maximum or minimum, a line ending, or a point on a curve with locally maximal curvature). Blob detection generally refers to detecting regions of an image that differ with respect to some property of interest (e.g., brightness or color) compared to surrounding regions. If a property of interest is expressed as a function of position relative to an image, blob detection approaches can apply differential methods or focus local extrema to identify blobs.

The image segments can then be provided to the feature extractor 204. For each image segment, the feature extractor 204 can extract a set of features. The set features for a given image segment can be extracted using a variety of computer-vision techniques. The segment classifier 206 can use the set of features to classify the given image segment (e.g., as a certain type of field or associated label).

Image segmenter 202 may also perform feature extraction while segmenting the digital image and may even use some of the same feature extraction techniques that are used by the feature extractor 204. The image segmenter 202 may extract features for the entire digital image and use those features to partition the digital image 118 into the image segments 208. The feature extractor 204, by contrast, may extract features separately for each individual image segment and provide each image segment's respective features as an input instance to the segment classifier 206.

Figure 3:
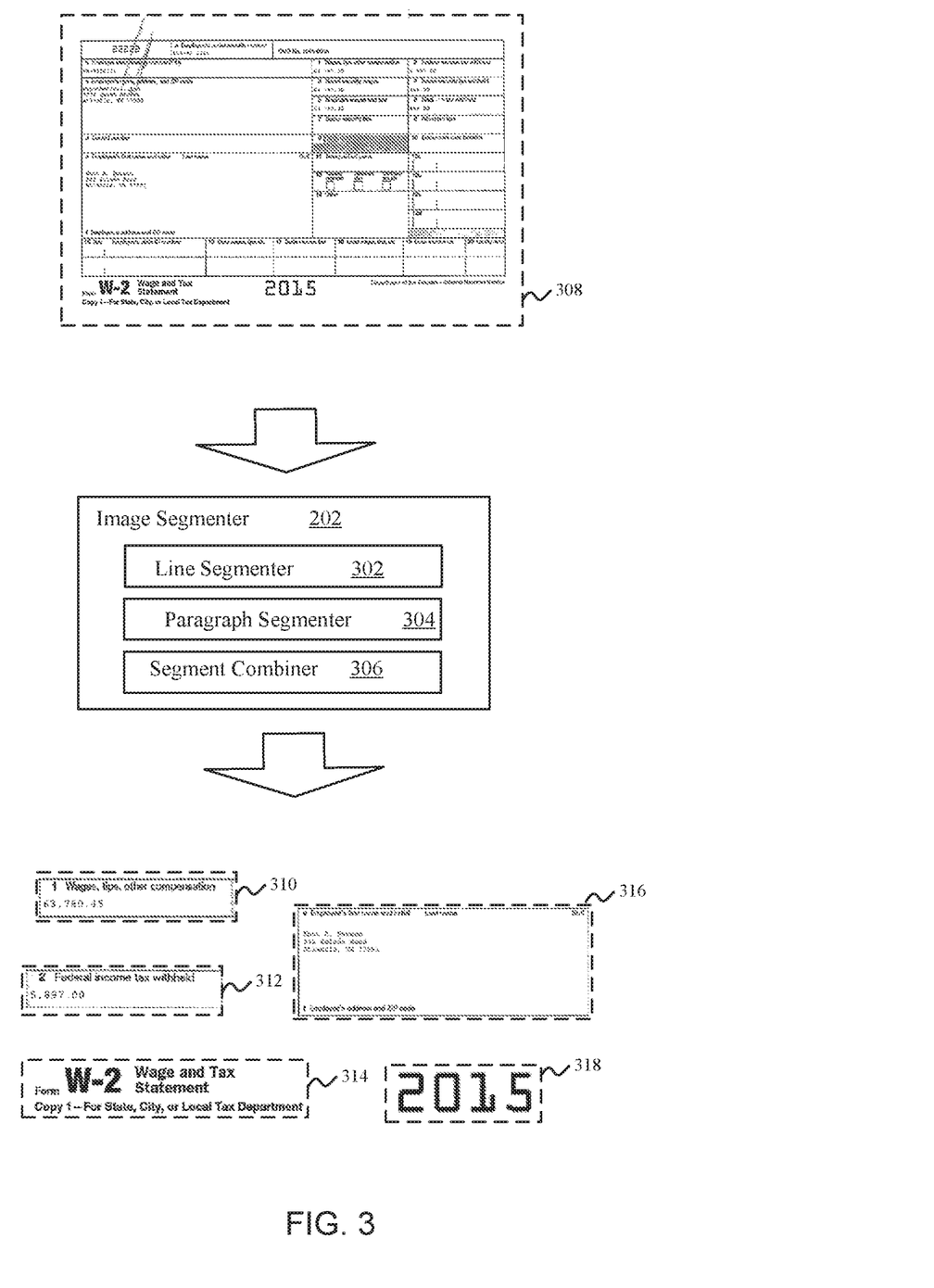
FIG. 3 is a detailed view of an image segmenter, according to one embodiment.

FIG. 3 is a more detailed view of the image segmenter 202, according to one embodiment. As shown, the digital image 308 is an image of a W2 tax form. The image segmenter 202 segments the digital image 308 using both a line segmenter 302 and a paragraph segmenter 304. Further, the line segmenter 302 and the paragraph segmenter 304 can operate in parallel so that neither has to wait for the other to finish executing. The line segmenter 302 may be biased towards identifying regions that are fully or partially enclosed by line boundaries or edge boundaries as image segments. The paragraph segmenter 304 may be biased towards identifying regions that are surrounded by whitespace of a predefined width.

In some cases, image segments defined by the line segmenter 302 may overlap with image segments defined by the paragraph segmenter 304. When this occurs, the segment combiner 306 can combine overlapping image segments into a single image segment or discard redundant image segments that are completely contained within other image segments.

When the segment combiner 306 is finished reconciling the image segments produced by the line segmenter 302 and the paragraph segmenter 304, a final set of image segments is compiled. Image segments 310, 312, 314, 316, and 318 are some examples of image segments that may be produced when the image segmenter 302 operates on the digital image 308.

Figure 4:
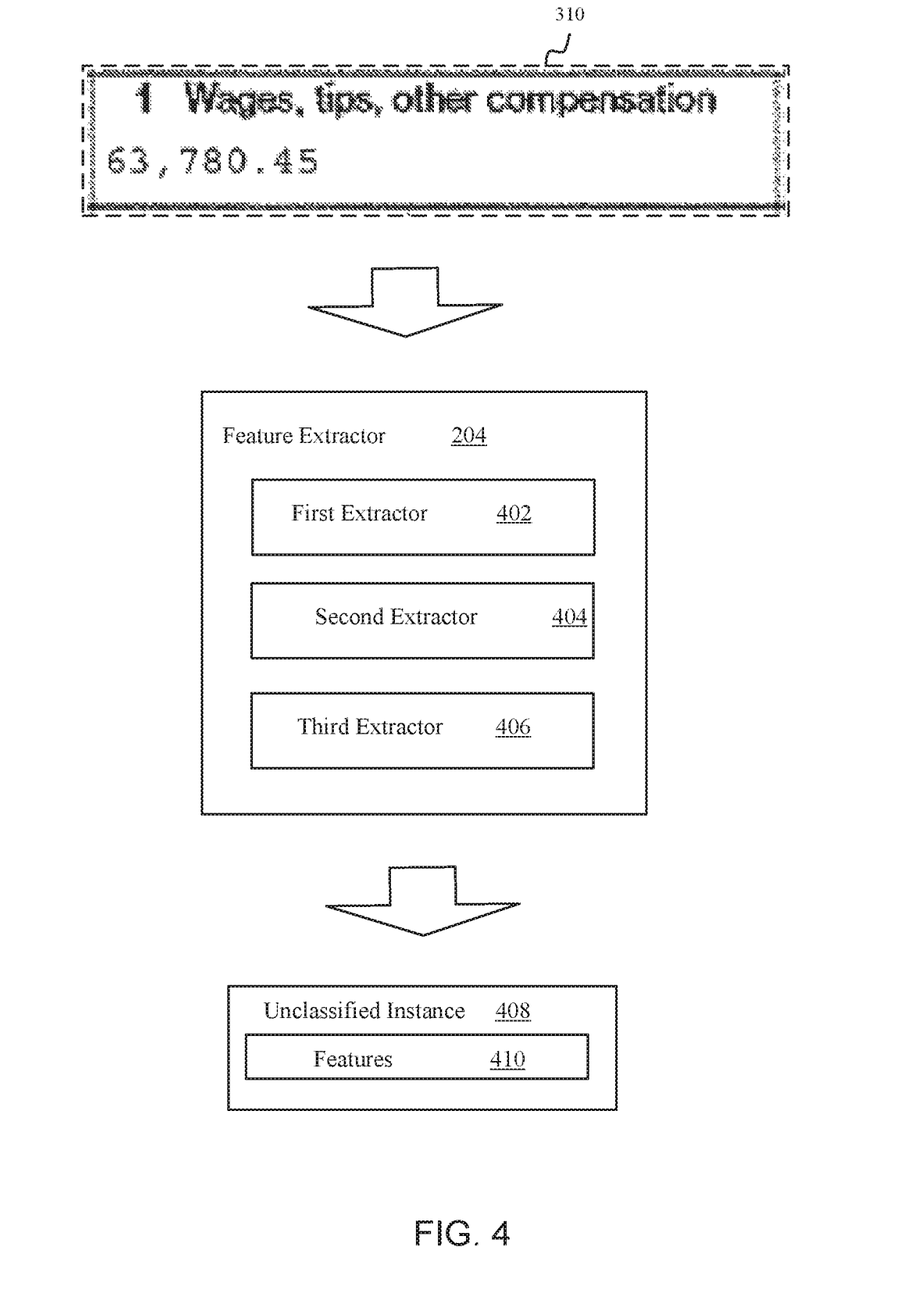
FIG. 4 is a detailed view of an example feature extractor and illustrates an example of creating an input instance for a machine-learning model, according to one embodiment.

FIG. 4 is a more detailed view of the feature extractor 204 and illustrates an example of how features can be used to create an instance. The image segment 310 can be provided to the feature extractor 204. The first extractor 402 can extract features from the image segment 310 using a first set of feature-extraction techniques. The second extractor 404 can extract features from the image segment 310 using a second set of feature-extraction techniques. The third extractor 406 can extract features from the image segment 310 using a third set of feature-extraction techniques.

Features extracted by the first extractor 402, the second extractor 404, and the third extractor 406 can be compiled into the features 410. The features 410 can make up an unclassified instance 408 that is suitable to be used as input for a machine-learning model. The unclassified instance 408 can be put into any format that a machine-learning model uses for its input. For example, the unclassified instance may be a line in an attribute-relation file format (ARFF) file that includes the features 410 delimited by commas.

Figure 5:
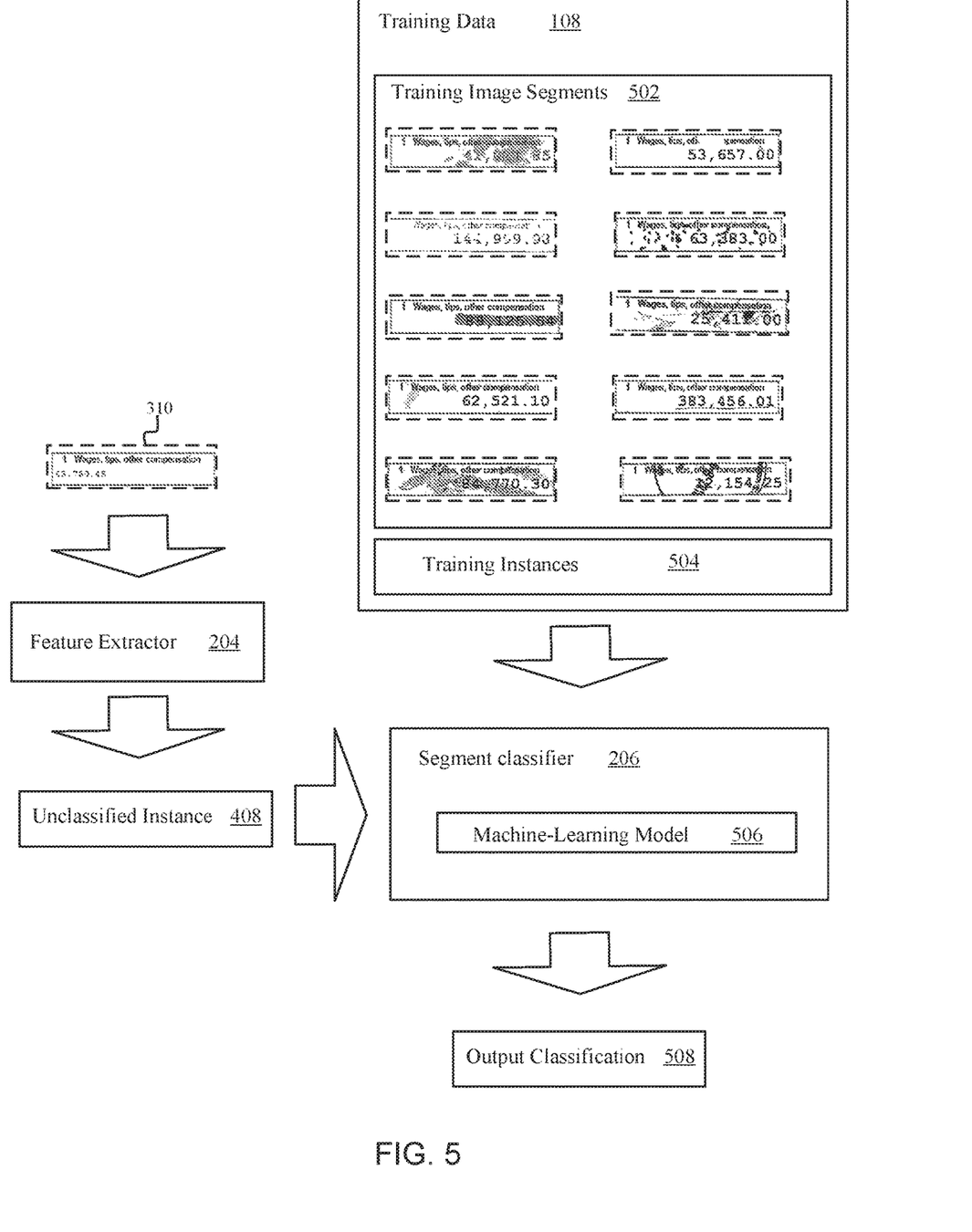
FIG. 5 illustrates an example of training a segment classifier to classify image segments without using OCR, according to one embodiment.

FIG. 5 illustrates an example of training the segment classifier 206 to classify image segments without OCR. As shown, the segment classifier 206 includes a machine-learning model 506 (e.g., a computer-implemented predictive model that can classify input data and can improve its prediction accuracy using training data without being explicitly reprogrammed). Training Data 108 can include training image segments 502. The training image segments 502 can include image segments that have been assigned verified classifications. For example, the training image segments 502 can comprise image segments that have been classified as box 1 fields from images of W-2 tax forms. Each of the training instances 504 can be a representation of a corresponding image segment that includes extracted features extracted from the corresponding image segment. In addition, some, most, or all of the training instances can include verified classifications for the respective image segments they represent. One common format that is used to input training data into machine learning models is the attribute-relation file format (ARFF).

The training instances 504 can be used to train and refine the machine-learning model 506. There are different types of inductive and transductive machine-learning models that can be used for the machine-learning model 506. Examples of machine-learning models include adsorption models, neural networks, support vector machines, radial basis functions, Bayesian belief networks, association-rule models, decision trees, k-nearest-neighbor models, regression models, Hopfield networks, deep belief networks, and Q-learning models.

Note that many configurations and parameter combinations may be possible for a given type of machine-learning model. With a neural network, for example, the number of hidden layers, the number of hidden nodes in each layer, and the existence of recurrence relationships between layers can vary. True gradient descent or stochastic gradient descent may be used in the process of tuning weights. The learning rate parameter, which partially determines how much each weight may be adjusted at each step, may be varied. Input features may be normalized. Other parameters that are known in the art, such as momentum, may also be applied to improve neural network performance. In another example, decision trees can be constructed using a variety of approaches. Some examples include the iterative dichotomiser 3 (ID3), Classification and Regression Tree (CART), and CHi-squared Automatic Interaction Detection (CHAID) methods. These methods may determine the order in which attribute values are examined in decision trees. Examples of such metrics include information gain and Gini impurity. In addition, pruning methods may be applied to improve decision tree performance. Examples of pruning techniques include reduced error pruning, cost complexity pruning, and alpha-beta pruning.

Furthermore, individual machine learning models can be combined to form an ensemble machine-learning model. An ensemble machine-learning model may be homogenous (i.e., using multiple member models of the same type) or non-homogenous (i.e., using multiple member models of different types). Individual machine-learning models within an ensemble may all be trained using the same training data or may be trained using overlapping or non-overlapping subsets randomly selected from a larger set of training data.

Once trained using the training instances 504, the machine-learning model 506 is ready to classify instances (which represent image segments) as specific types of labels or fields. The feature extractor 204 can extract features from the image segment 310 and use the extracted features to create an unclassified instance 408 that corresponds to the image segment 310. The segment classifier 206 can feed the unclassified instance 408 to the machine-learning model 506. The machine-learning model can determine an output classification 508 for the unclassified instance 408 (and therefore for the image segment 310). Possible output classifications in this example may include "box 1," "box 2," "box 3," or some another box in a W-2 tax form.

In the present example, the training image segments 502 shown in FIG. 5 are examples of image segments of box 1 of a W-2 tax form. However, training image segments 502 can include other types of image segments. For example, the training image segments 502 also generally include other image segments of other fields in W-2 forms (or, if a more generalized model is sought, other types of forms). Furthermore, some of the training image segments 502 may be box-1 image segments from W-2 forms that have different templates. The machine-learning model may identify a correct classification for a box-1 image segment even if the box-1 image segment is not located in the same place in all W-2 forms.

Figure 6:
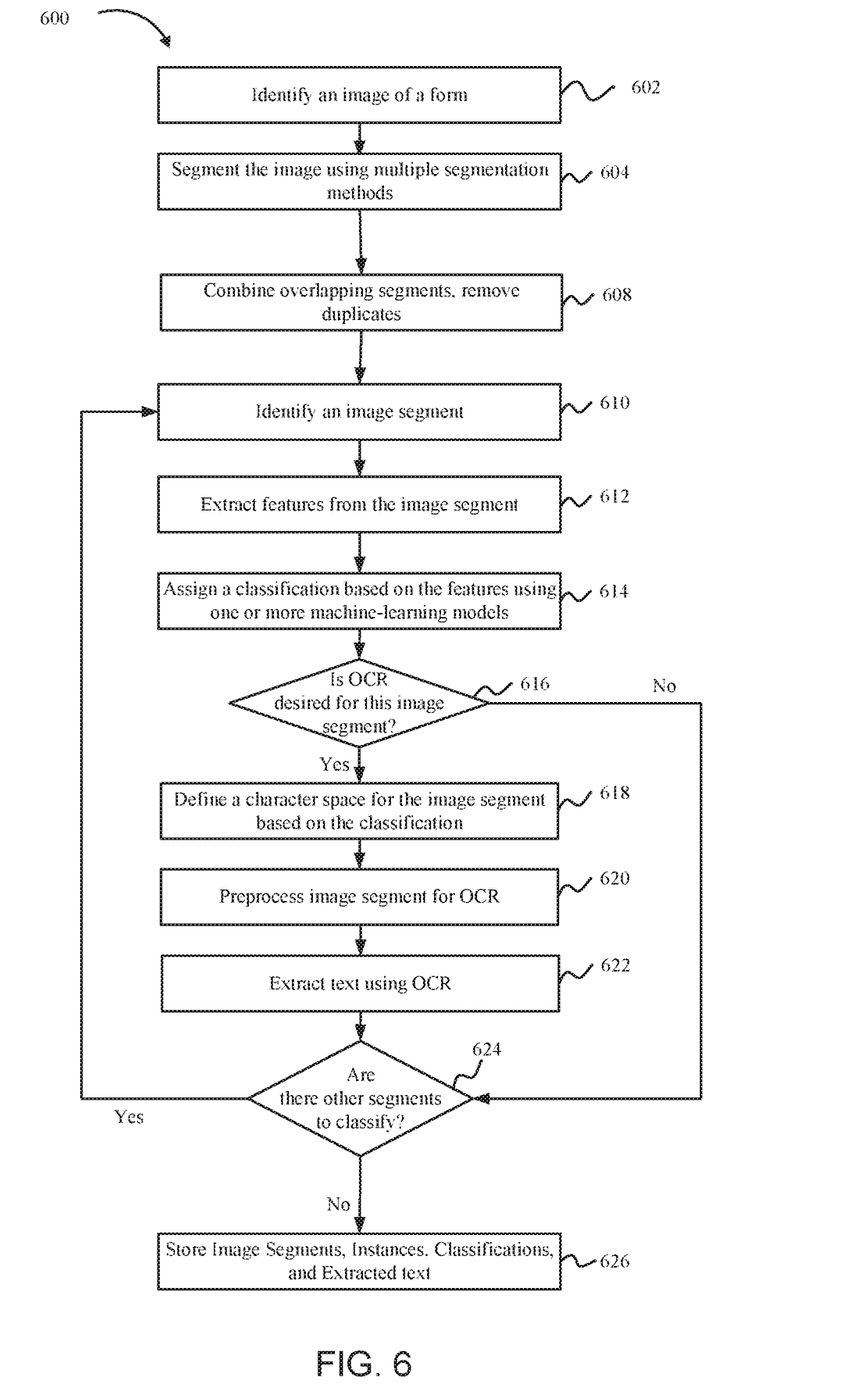
FIG. 6 illustrates a method for identifying fields and labels in images without using OCR, according to one embodiment.

FIG. 6 illustrates a method 600 for identifying fields and labels in images without using OCR. The method 600 can be executed as instructions on a machine (e.g., by one or more processors), where the instructions are included on at least one computer-readable storage medium (e.g., a transitory or non-transitory computer-readable storage medium).

At block 602, the processors identify an image of a form. The image may have been taken using a digital camera or a scanner. The form may be, for example, a tax form such as a W-2, a 1099-MISC, a 1098-T, or a 1040. The form may have been printed on paper before the image was taken. The image may be in a raster format such as Joint photographic Experts Group (JPEG), Tapped Image File Format (TIFF), Graphics Interchange Format (GIF), Bitmap (BMP), or Portable Network Graphics (PNG). Alternatively, the image may be in a vector format such as Computer Graphics Metafile (CGM) or Scalable Vector Graphics (SVG). The image may be in color, grayscale, or black and white.

At block 604, the processors segment the image of the form using multiple segmentation methods. Some image segmentation methods that may be used include techniques based on line boundaries, whitespace boundaries, thresholding, clustering, compression, histograms, edge detection, region growing, graph partitioning, and watershed transformation. Each of the multiple segmentation methods can demarcate a number of image segments that are found in the image. In some embodiments, the multiple image segmentations may execute in parallel using multiple copies of the image.

At block 608, the processors combine overlapping image segments and removing or discarding duplicate image segments. This may be desirable if overlap exists between image segments demarcated by the multiple image segmentation methods.

At block 610, the processors identify a specific image segment that was demarcated using one or more of the multiple segmentation methods.

At block 612, the processors extract or detecting features from the image segment that was identified in block 610. The features may be extracted or detected using one or more computer-vision feature-extraction techniques. The extracted features can be put into an input instance that serves as a representation of the image segment and is in a format can be parsed by a machine-learning model.

At block 614, the processors assign a classification for the image segment based on the extracted features using one or more machine-learning models. Specifically, the features extracted from the image segment can be evaluated by the one or more machine-learning models. The one or more machine-learning models can then output a classification for the instance (and the image segment represented thereby). The classification may identify the image segment as a particular type of field that contains a particular type of information.

At decision block 616, the processors determine whether OCR is to be used on the image segment so that textual information in the image segment can be extracted into computer-readable text. In one example, a user may manually specify that OCR is to be performed. In another example, the classification may indicate that OCR is unnecessary (and therefore not desired) because the image segment is a check box, a radio button, a blank field, or some other type of field that is not likely to contain extractable text of interest. In another example, image-quality metrics for the image segment can be determined. If the image-quality metrics fail to meet certain predefined thresholds, OCR can be forgone to avoid wasting processing time and resources on segments that are unlikely to yield good OCR results. If OCR is not desired, blocks 618-622 can be skipped for the image segment.

At block 618, the processors define a character space for the image segment based on the classification that was assigned by the one or more machine-learning models. In one example, if the classification indicates that the image segment is "box a" or "box b" from a W-2 form, the character space for the image segment can be defined as the digits 0-9 and the hyphen character. In another example, if the classification indicates that the image segment is "box 1" of a W2 form, the character space for the image segment can be defined as the digits 0-9, the comma character, and the period character. In another example, if the classification indicates that the image segment is a field for a middle initial, the character space for the image segment can be defined as all capital and lower-case letters and the period character.

At block 620, the processors preprocess the image segment for OCR. The preprocessing may, for example, remove noise, reduce blurring, and increase contrast. The number of colors in the image segment may be reduced. Brightness, skew, and distortion may be adjusted. Smoothing filters, sharpening filters, log transformations, and mask processing may be applied.

At block 622, the processors extract text from the image segment using OCR.

Multiple occurrences of blocks 610-622 can be executed in parallel (e.g., via multi-threading or across multiple processing cores) so that multiple image segments can be processed at the same time.

At block 624, the processors determine whether there are any additional image segments to classify. If, for example, one or more image segments extracted from the image have not yet been classified, blocks 610-622 can be repeated.

At block 626, the processors store image segments, instances, classifications, and extracted text from blocks 608-624 in a data store. The term "data store" may refer to any device or combination of devices capable of storing, accessing, organizing, or retrieving data, which may include any combination and number of data servers, relational databases, object oriented databases, simple web storage systems, cloud storage systems, data storage devices, data warehouses, flat files, and data storage configuration in any centralized, distributed, or clustered environment. The storage system components of the data store may include storage systems such as a SAN (Storage Area Network), cloud storage network, volatile or non-volatile RAM, optical media, or hard-drive type media.

Figure 7:
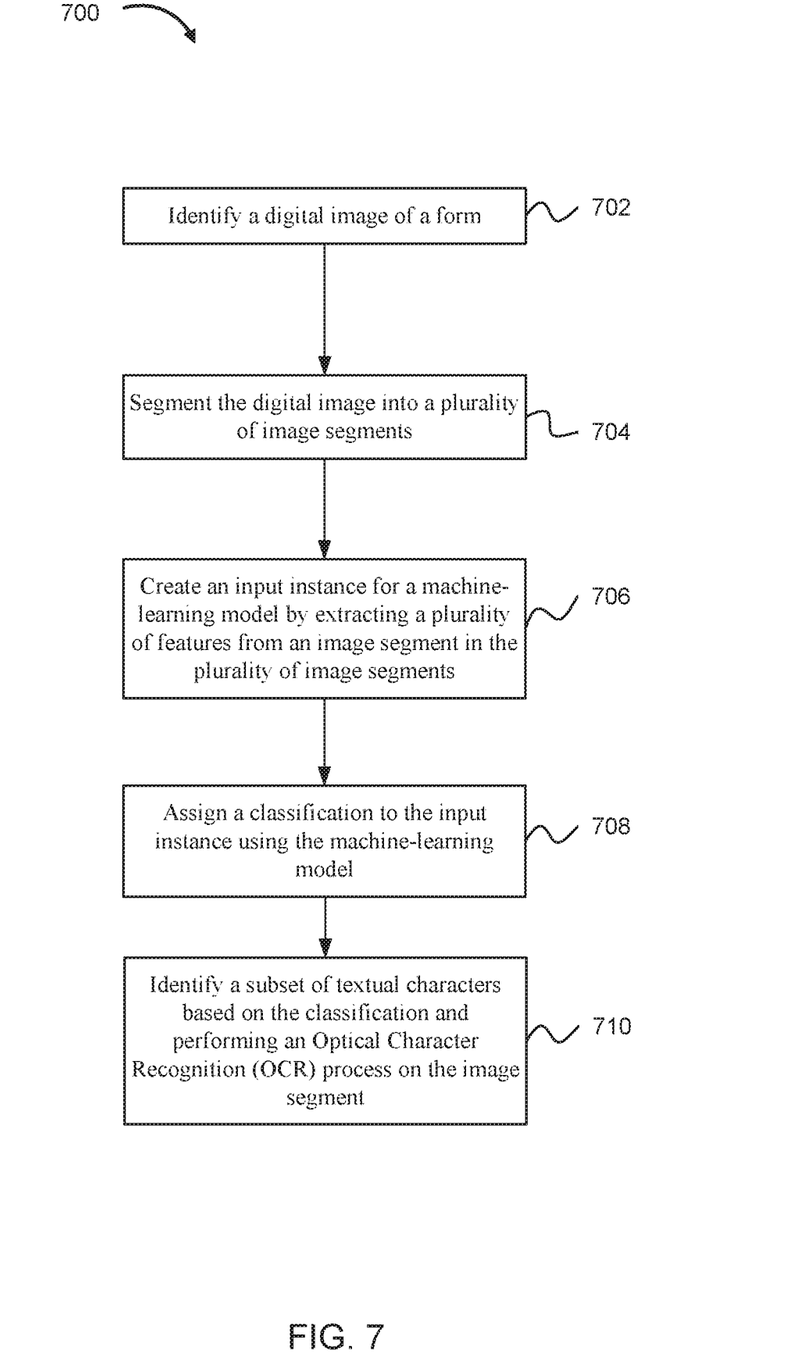
FIG. 7 illustrates a method for classifying an image segment without using OCR, according to one embodiment.

FIG. 7 illustrates a method 700 for classifying an image segment without using OCR. The method 700 can be executed as instructions on a machine (e.g., by one or more processors), where the instructions are included on at least one computer-readable storage medium (e.g., a transitory or non-transitory computer-readable storage medium).

At block 702, the processors identify a digital image of a form. The form can contain a plurality of fields and a plurality of labels associated with the fields.

At block 704, the processors segment the digital image into a plurality of image segments. The digital image may be segmented independently by multiple computer-vision image segmentation techniques. For example, the digital image can be segmented using a first method that is based on line boundaries. The digital image can also be segmented using a second method that is based on whitespace boundaries. In this example, the method 700 can also include identifying overlap between a line-boundary image segment and a whitespace-boundary image segment and combining the line-boundary image segment and the whitespace-boundary image segment to form a combined image segment.

At block 706, the processors create an input instance for a machine-learning model by extracting a plurality of features from an image segment in the plurality of image segments. The plurality of features can be extracted using one or more computer-vision feature-extraction techniques.

At block 708, the processors assign a classification to the input instance using the machine-learning model. The classification can associate the input instance with a field type or a label type.

In some examples, the classification and the image segment can be provided for user inspection on a display. If the classification is erroneous, the user can provide feedback indicating a corrected classification. After this feedback is received, a training instance can be created for the machine-learning model. The training instance comprises the plurality of features and the corrected classification.

At block 710, in some examples, the processors identify a subset of textual characters based on the classification and performing an Optical Character Recognition (OCR) process on the image segment subject to a constraint that text extracted by the OCR process can only include textual characters found in the subset of textual characters. The image segment can be preprocessed before performing the OCR process. The preprocessing can include at least one of: spatial image filtering, point processing, contrast stretching, or thresholding.

Figure 8:
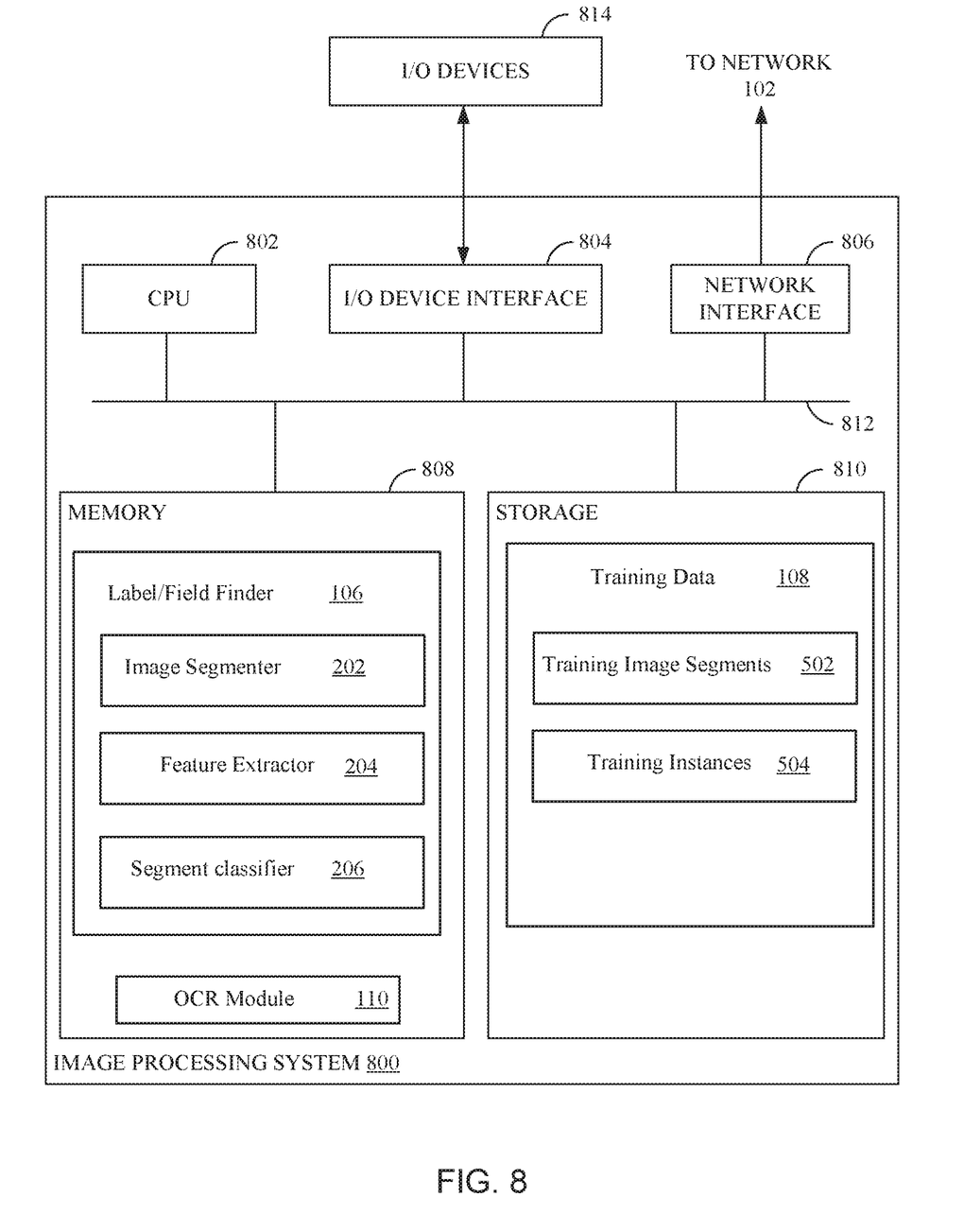
FIG. 8 illustrates an example image processing system that locates fields and labels in a digital image of a form without using OCR, according to one embodiment.

FIG. 8 illustrates an example image processing system 800 that locates fields and labels in a digital image of a form without using OCR, according to an embodiment. As shown, the image processing system 800 includes, without limitation, a central processing unit (CPU) 802, one or more I/O device interfaces 804 which may allow for the connection of various I/O devices 814 (e.g., keyboards, displays, mouse devices, pen input, etc.) to the image processing system 800, network interface 806, a memory 808, storage 810, and an interconnect 812.

CPU 802 may retrieve and execute programming instructions stored in the memory 808. Similarly, the CPU 802 may retrieve and store application data residing in the memory 808. The interconnect 812 transmits programming instructions and application data, among the CPU 802, I/O device interface 804, network interface 806, memory 808, and storage 810. CPU 802 can represent a single CPU, multiple CPUs, a single CPU having multiple processing cores, and the like. Additionally, the memory 806 represents random access memory. Furthermore, the storage 810 may be a disk drive. Although shown as a single unit, the storage 810 may be a combination of fixed or removable storage devices, such as fixed disc drives, removable memory cards or optical storage, network attached storage (NAS), or a storage area-network (SAN).

As shown, memory 808 includes a label/field finder 106 and, optionally, an OCR module 110. The label/field finder 106 comprises an image segmenter 202, a feature extractor 204, and a segment classifier 206. A digital image of a form can be sent to the label/field finder 106 from the I/O devices 814 or from another source, such as the network 102. The image segmenter 202 can identify and separate image segments that are found within the digital image. The feature extractor 204 can, for each image segment, extract or detect a set of respective features. The segment classifier 206 can use the set of respective features for each image segment to assign a classification for the image segment. The classification may associate the image segment with a certain field type or label type.

Optionally, the image segments and their classifications can then be provided to the OCR module 110. For each image segment, the OCR module 110 can define a subset of textual characters that can be included therein based on the image segment's classification. The OCR module 110 can then extract text from the image segment such that extracted characters are either constrained to be, or biased toward being, characters in the subset.

As shown, storage 810 includes training data 108. The training data 108 may include training image segments 502 and training instances 504. A training instance is be a representation of a training image segment and includes features extracted therefrom. A training instance can also include an accepted, known, or verified classification for the training image segment that the training instance represents. The segment classifier uses some or all of the training data 108 to train or refine a machine-learning model to classify image segments.

As used herein, the word "or" indicates an inclusive disjunction. For example, as used herein, the phrase "A or B" represents an inclusive disjunction of exemplary conditions A and B. Hence, "A or B" is false only if both condition A is false and condition B is false. When condition A is true and condition B is also true, "A or B" is also true. When condition A is true and condition B is false, "A or B" is true. When condition B is true and condition A is false, "A or B" is true. In other words, the term "or," as used herein, should not be construed as an exclusive disjunction. The term "xor" is used where an exclusive disjunction is intended.

While the foregoing is directed to embodiments of the present disclosure, other and further embodiments of the disclosure may be devised without departing from the basic scope thereof, and the scope thereof is determined by the claims that follow.

What is claimed is:

1. A method for identifying form fields in a digital image, the method comprising:
    receiving, over a network, a digital image of a form taken by a computing device;
    generating, based on the digital image, a set of image segments with a set of image segmentation techniques;
    extracting a set of features from each image segment with a set of feature extraction techniques;
    classifying a first image segment of the set of image segments using a machine-learning model, wherein the machine-learning model is trained using training data that includes:
        a set of training image segments,
        a set of extracted features from each training image segment, and
        an assigned verified classification for each training image segment that indicates to not perform optical character recognition (OCR) based on the training image segment not including extractable text;
    determining an image-quality metric of the first image segment is below a threshold requirement; and
    determining, based on the classification and the image-quality metric of the first image segment, to not perform OCR on the image segment.

2. The method of claim 1, wherein generating the set of image segments includes:
    identifying line boundaries in the digital image; and
    defining regions in the digital image based on the line boundaries.

3. The method of claim 2, wherein generating the set of image segments includes:
    identifying an overlap between a line-boundary image segment and a whitespace-boundary image segment; and
    combining the line-boundary image segment and the whitespace-boundary image segment to form a combined image segment.

4. The method of claim 1, wherein the set of features includes one or more features that are invariant to scaling, translation, and rotation.

5. The method of claim 1, further comprising:
    receiving user feedback indicating a corrected classification to assign to the field; and
    creating a training instance for the machine-learning model, wherein the training instance comprises the set of features and the corrected classification.

6. The method of claim 1, further comprising:
    extracting, in parallel, a plurality of features from each segment of the set of image segments; and
    classifying, in parallel, a field in each image segment in the set of image segments based on the plurality of features using the machine-learning model.

7. A non-transitory computer-readable storage medium containing instructions that, when executed by one or more processors, perform an operation for identifying form fields in a digital image, the operation comprising:

receiving, over a network, a digital image of a form taken by a computing device;

generating, based on the digital image, a set of image segments with a set of image segmentation techniques;

extracting a set of features from each image segment with a set of feature extraction techniques;

classifying a first image segment of the set of image segments using a machine-learning model, wherein the machine-learning model is trained using training data that includes:

a set of training image segments,         a set of extracted features from each training image segment, and         an assigned verified classification for each training image segment that indicates to not perform optical character recognition (OCR) based on the training image segment not including extractable text;

determining an image-quality metric of the first image segment is below a threshold requirement; and     determining, based on the classification and the image-quality metric of the first image segment, to not perform OCR on the image segment.

8. The computer-readable storage medium of claim 7, wherein generating the set of image segments includes:

identifying line boundaries in the digital image; and defining regions in the digital image based on the line boundaries.

9. The computer-readable storage medium of claim 8, wherein generating the set of image segments includes:

identifying an overlap between a line-boundary image segment and a whitespace-boundary image segment; and     combining the line-boundary image segment and the whitespace-boundary image segment to form a combined image segment.

10. The computer-readable storage medium of claim 7, wherein the set of features includes one or more features that are invariant to scaling, translation, and rotation.

11. The computer-readable storage medium of claim 7, wherein the operation further comprises:

receiving user feedback indicating a corrected classification to assign to the field; and     creating a training instance for the machine-learning model, wherein the training instance comprises the set of features and the corrected classification.

12. The computer-readable storage medium of claim 7, wherein the operation further comprises:

extracting, in parallel, a plurality of features from each segment of the set of image segments; and     classifying, in parallel, a field in each image segment in the set of image segments based on of features using the machine-learning model.

13. A system, comprising:

a processor; and a memory storing one or more applications, which, when executed on the processor performs an operation for identifying form fields in a digital image, the operation comprising:

receiving, over a network, a digital image of a form taken by a computing device;

generating, based on the digital image, a set of image segments with a set of image segmentation techniques;

extracting a set of features from each image segment with a set of feature extraction techniques;

classifying a first image segment of the set of image segments using a machine-learning model, wherein the machine-learning model is trained using training data that includes:

a set of training image segments,             a set of extracted features from each training image segment, and             an assigned verified classification for each training image segment that indicates to not perform optical character recognition (OCR) based on the training image segment not including extractable text;

determining an image-quality metric of the first image segment is below a threshold requirement; and         determining, based on the classification and the image-quality metric of the first image segment, to not perform OCR on the image segment.

14. The system of claim 13, wherein generating the set of image segments includes:

identifying an overlap between a line-boundary image segment and a whitespace-boundary image segment; and     combining the line-boundary image segment and the whitespace-boundary image segment to form a combined image segment.

15. The method of claim 1, wherein the set of image segmentation techniques are based on line boundaries, whitespace boundaries, thresholding, clustering, compression, histograms, edge detection, region growing, graph partitioning, or watershed transformation.

16. The method of claim 1, wherein the classification of the first image segment is a field type or a label type.

17. The computer-readable storage medium of claim 7, wherein the set of image segmentation techniques are based on line boundaries, whitespace boundaries, thresholding, clustering, compression, histograms, edge detection, region growing, graph partitioning, or watershed transformation.

18. The computer-readable storage medium of claim 7, wherein the classification of the first image segment is a field type or a label type.

19. The system of claim 13, wherein the set of image segmentation techniques are based on line boundaries, whitespace boundaries, thresholding, clustering, compression, histograms, edge detection, region growing, graph partitioning, or watershed transformation.

20. The system of claim 13, wherein the classification of the first image segment is a field type or a label type.

\* \* \* \* \*